United States Patent [19]

Lee et al.

[11] Patent Number: 5,310,263

[45] Date of Patent: May 10, 1994

[54] SELF-ACTING AIR BEARING FOR HIGH SPEED LASER SCANNER

[75] Inventors: J. Kelly Lee, Rochester; Haribhajan S. Kocher, Penfield; R. David Burns, Pittsford, all of N.Y.

[73] Assignee: Eastman Kodak Company, Rochester, N.Y.

[21] Appl. No.: 815,719

[22] Filed: Dec. 30, 1991

[51] Int. Cl.$^5$ .................................................. F16C 32/06
[52] U.S. Cl. ...................................................... 384/100
[58] Field of Search ............... 384/100, 103, 107, 109, 384/114, 121, 322, 907

[56] References Cited

U.S. PATENT DOCUMENTS

| | | | |
|---|---|---|---|
| 3,983,270 | 9/1976 | Licari et al. | 427/372.2 |
| 4,547,081 | 10/1985 | Tanaka et al. | 384/107 |
| 4,728,201 | 3/1988 | Abbe | 384/100 X |
| 4,815,294 | 3/1989 | David | 384/100 X |
| 4,934,836 | 6/1990 | Tanaka et al. | 384/100 |

OTHER PUBLICATIONS

"Krytox Flurorinated Greases," DuPont Product Information Bulletin, p. 1: No Date.
"Experiments on an Ultrastable Gas Journal Bearing," S. B. Malanoski, *Journal of Lubrication Technology*, Oct. 1967, p. 433.
"NSK Grooved Hydrodynamic Bearings," NSK Corporation, Bearing Division, pp. 12: and 15.
NSK Report No. Kengai 489030, Mar. 1989, p. 3 (Table I); pp. 10, 11, 20.
The American Society of Mechanical Engineers, *Transactions of the ASME*, p. 2, col. 2: (Jnl. of Tribology, 90-Trib-43).
*Optical Scanning*, G. G. Marshall, p. 489, sect. 9.2.3. Dec. 1991.
*Tribology Handbook*, M. J. Neale, p. A10, "Self-Acting Gas Bearings", pp. B3 and B5, Boundary lubrication . .

*Primary Examiner*—Thomas R. Hannon
*Attorney, Agent, or Firm*—Mark Z. Dudley

[57] ABSTRACT

A self-acting air bearing operable at very high speed in a non-vertical spin axis in a beam scanning optical system provides precise rotation of a rotable hologon disk. Pretreatment of the bearing surfaces with a residual boundary lubricant allows reliable operation over an extended series of start/stop cycles. The tilt of the bearing/disk assembly allows the construction of an optical system more compact than in conventional hologon beam scanning systems.

14 Claims, 1 Drawing Sheet

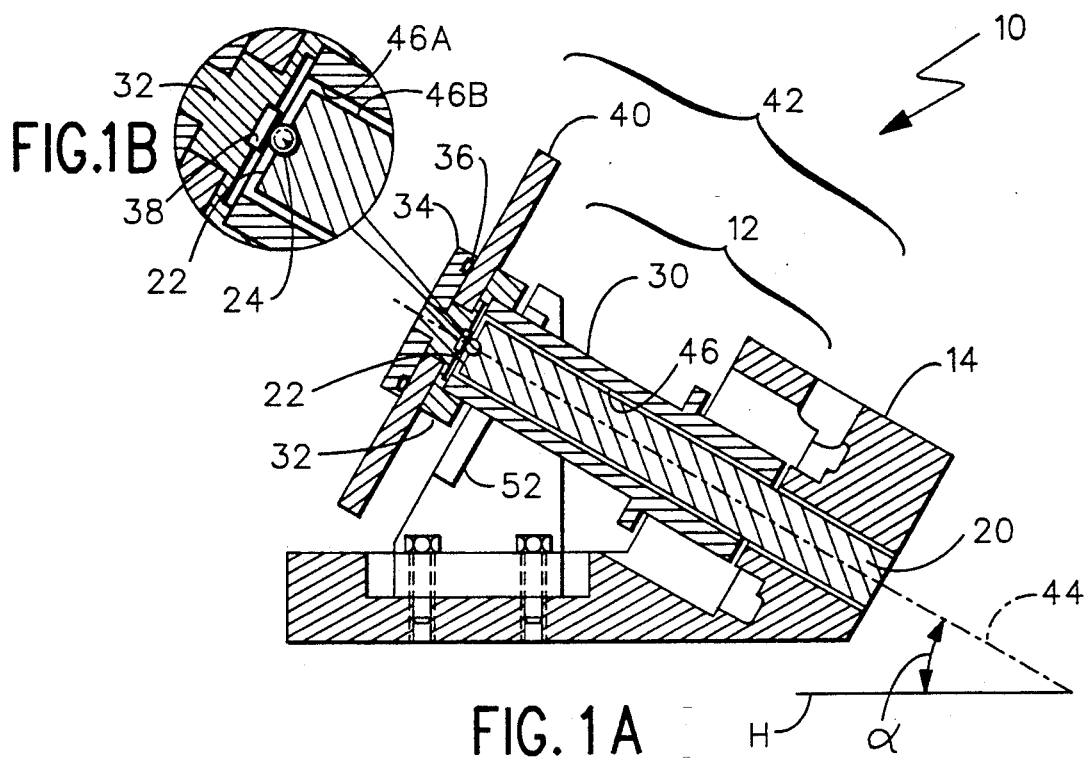
FIG. 1A
FIG. 1B
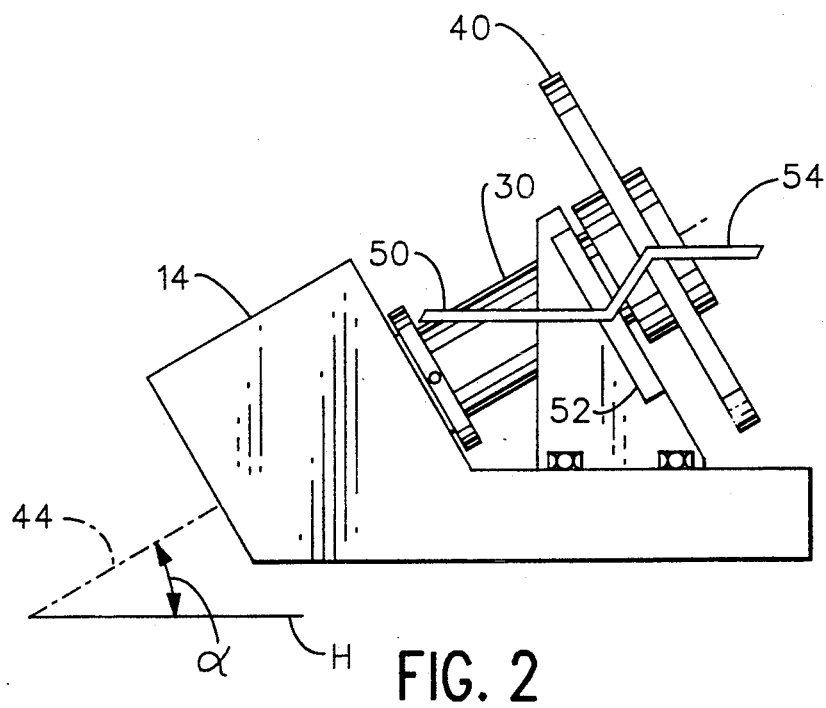
FIG. 2

SELF-ACTING AIR BEARING FOR HIGH SPEED LASER SCANNER

TECHNICAL FIELD

This invention relates to hydrodynamic bearings, and in particular to a self-acting aerodynamic (gas) bearing.

BACKGROUND OF THE INVENTION

In the operation of a self-acting hydrodynamic bearing, a load may be supported by the pressure generated by fluid flow in the bearing gap by the relative motion of the bearing surfaces and viscosity of the fluid. Such bearings may be distinguished according to the composition of the fluid (air vs. oil, grease and the like) and the character of the bearing surface (either plain or grooved), and type of relative motion (journal or thrust).

Bearings which are designed to operate using fluids such as oil and grease require a greater gap than is necessary for an air bearing, the latter having a gap in the range of 2.5 to 5 micrometers. Oil- and grease-lubricated bearings experience a much larger drag torque on the bearing surfaces due to the much higher viscosity of the lubricant, which fills the gap as a thick film. The drag torque can be significant and the bearing starting torque can be undesireably high. The fluid is also subject to loss via leakage or evaporation, and to the detrimental effects of shearing stress and cavitation. As there is a significant risk of contamination of any optical assemblies that are proximate to the bearing, the bearing design must incorporate lubricant seals that are costly and complex, and which are themselves subject to failure.

Air bearings are therefore particularly suited to low-noise, high-speed, high-accuracy bearing applications, which makes them attractive for use in optical scanners In many instances it has been the availability of a gas bearing, which provides a high-accuracy, high-speed spin axis, that has broadened the scope of modern scanning applications. Self-acting air bearings are therefore the predominant bearing design in high-speed rotating polygon and hologon laser deflection systems.

Conventional self-acting air bearings are designed to be entirely free of the oil or grease associated with other hydrodynamic bearings. Unfortunately, a self-acting air bearing requires relative movement of the surfaces to generate pressure in the bearing gap. Some rubbing of the bearing surfaces takes place at start-up (wherein the bearing experiences "lift-off") and shut-down (wherein the bearing experiences "touch-down"). The bearing surfaces must therefore be manufactured from, or coated with, very hard materials such as nickel, ceramics, or cermets. Whereas these materials may be machined to the extremely high surface accuracies required for self-acting gas bearings, such materials are very expensive to fabricate and finish. For example, a ceramic piece may have a unit cost that is ten times the cost of a similarly-shaped piece that is fabricated from stainless steel.

Attempts to reduce starting friction and wear by the use of coatings with high sliding wear resistance, or boundary lubrication with fatty acids, have had limited success. Inserts do not provide the necessary surface accuracy over bearing life that the metallic or ceramic surfaces do. With respect to boundary lubrication, dispersion (creep) of the lubricant remains a problem. The conventional approach seeks to "wet" the bearing surface (i.e. establish a continuous oil film that will separate the bearing surfaces) without causing the lubricant to leave the bearing. Barrier films have been used to control the spread of a lubricant to nonbearing surfaces However, barrier films must be used with great care to avoid contamination of the bearing surfaces which renders them nonwettable and subject to wear.

When rotated, self-acting air bearings are subject to a complex instability phenomena. External vibration at specific frequencies, or poor balance, can stimulate these instabilities. The major factors contributing to instability are typically simplified to include mass/stiffness resonance and high-speed whirl. The former is the well-known type of resonance which occurs in every spring-mass system. However, in self-acting gas bearings, stiffness will change with speed and will not necessarily be linear with deflection. Bearings must be therefore be designed such that this resonance lies outside the frequency range of any likely external vibration and the speed range is below this resonance. If this is not possible, sufficient damping must be built in to limit the vibration amplitude. However, it is difficult to adequately dampen a hologon rotor assembly by means of shock mounting, because the hologon must rotate about its spin axis without the positional deviations associated with the flexure of a shock mount damping apparatus.

Air bearings operate on a very thin air film (5-10 $\mu$m) between the bearing surfaces. The thinness and low damping of an air film make it necessary but extremely difficult to analyze the dynamic characteristics of the bearing for compliance, stability, and load carrying capacity at all of the possible excitation frequencies of the system. Nonetheless, the conventional remedy is to maintain close control of manufacturing tolerances, surface finishes, thermal and elastic distortions, alignment, and balancing.

Half-speed whirl is experienced when the average induced flow in a plain journal bearing running with no eccentricity occurs in the same direction as the rotation, but at half the rotational speed If the shaft is deflected from its central position, it will experience a centering force from the wedge effect and a backward torque from shear forces. These forces will cause the shaft to whirl in a direction opposite to the direction of rotation. When this whirl speed reaches the speed of flow around the bearing (i.e., half speed), there will be no relative flow through the gap and therefore the pressure forces will collapse. A bearing operating at twice the speed of its resonant frequency will tend to whirl at its resonant frequency, which is almost certain to cause bearing failure. If the bearing is to exceed this speed, it must be damped.

Fixed-geometry anti-whirl journal bearings have been proposed that achieve some degree of stability margin at the expense of reduced bearing stiffness (i.e., reduced load capacity) or increased friction. These designs include multi-lobes, Rayleigh steps or pockets, and axial grooves. Bearings with a build-in wedge effect, such as those having spiral grooving, are less effected by the instability induced by half-speed whirl, but are not immune to it. Other approaches include the use of attractive- or repulsive-magnet thrust bearings and tilting-pad radial air bearings, which nonetheless have unique drawbacks such as pad flutter, lockup, and pivot fretting.

All of the foregoing remedies increase the cost and complexity of the air bearing Moreover, no conventional approach has resulted in an inexpensive air bearing design that can withstand a series of start/stop cycles of more than about 20,000 cycles.

Accordingly, there remains, a distinct need for inexpensive, self-acting aerodynamic bearing for use in optical applications that can withstand a series of start/stop cycles well in excess of 20,000 cycles.

SUMMARY OF THE INVENTION

The improved self-acting air bearing of the present invention was developed in response to a need for an inexpensive cylindrical air bearing operable at very high speed and in a non-vertical spin axis. A grooveless (plain) air bearing was sought because such a design may be manufactured more easily and inexpensively. The bearing was needed to support a rotable hologon disk in an exacting (precisely-aligned) beam scanning optical system, and therefore the bearing was required to provide smooth, precise rotation of a relatively large load (the disk) over an extended series of start/stop cycles.

A further requirement was that the bearing should support high speed rotation of a holographic disk in a spin axis aligned at an oblique angle with respect to a horizontal plane (e.g., the plane of an optical bench or table top). Operation of the bearing at an oblique angle affords a significant advantage for a hologon-based beam-scanning system: the tilt of the bearing/disk assembly allows the construction of an optical system that is much more compact, and uses fewer optical elements, than found in conventional spinning hologon beam scanning systems.

We initially attempted to operate conventional grooved and plain cylindrical-type air bearings in an oblique spin axis, but because such bearings are designed for operation wherein their spin axis is aligned vertically, we subsequently found the conventional bearing designs to be susceptible to catastrophic bearing failure (seizing) within a very short time. Upon investigation, we ascertained that in even the most carefully designed bearings, there are residual modes of instability that are excited when the system passes from start-up to shut-down phases Further, such modes are exacerbated when the bearing is operated at an oblique angle, or when the bearing is subject to external vibrations. The incidence of such failure is also aggravated by the use of a grooveless bearing design, which is known to be prone to more instability than are grooved designs. As a result, the bearing suffers momentary impingement (touch-down) of the rotating member on the stationary bearing surface which eventually causes bearing failure.

Accordingly, we devised an improved self-acting air bearing, which may include a grooveless design, that effects smooth and precise rotation of a load at an oblique angle over an extended series of start/stop cycles.

The present invention will become more apparent when taken in conjunction with the following description and drawings, wherein like characters indicate like parts and wherein the drawings form a part of the present description.

BRIEF DESCRIPTION OF THE DRAWINGS

FIG. 1A and 1B are a side sectional view of an improved self-acting air bearing constructed according to the present invention for use in a hologon scanner system.

FIG. 2 is an alternate side view of the bearing assembly of FIG. 1.

DETAILED DESCRIPTION OF THE INVENTION

Illustrated in FIG. 1 is a hologon system 10 that includes a novel air bearing 12 constructed according to the present invention for use in laser scanning systems. The system 10 includes a base 14 from which extends a fixed cylindrical bearing spindle 20 having a solid end face 22 and a jewel 24 centrally-mounted on the face 22. A corresponding cylindrical bearing sleeve 30 has mountable thereon a disc support 32 and a threaded disc retention cap 34 and O-ring 36 for fixing a hologon disc 40 to the support 32 (thereby fixing the disc to the bearing sleeve 30). The integral combination of the disc 40, cap 34, O-ring 36, support 32, and bearing sleeve 30 form a rotor assembly 42.

At the underside of the disc support 32, an integral mating pad 38 is concentrically located such that as the rotor assembly 42 is fitted coaxially over the bearing spindle 20, the rotor assembly 42 is axially supported along spin axis 44 at the contact point of the jewel 24 and mating pad 38. The jewel 24 thus supports the thrust load of the rotor assembly 42. Preferably, the jewel 24 is a spherical ball made from a ultra-hard material such as synthetic sapphire. The mating pad 38 is preferably a metal alloy such as tungsten carbide. A major advantage of the jeweled thrust bearing over other thrust bearing designs is that the required starting torque is minimized. The jeweled thrust bearing also fixes the location of the hologon disc 40 along the spin axis 44, which is preferable to (for example) an air thrust bearing wherein axial motion of the the hologon has been found to significantly degrade the scanning accuracy of the system 10. As described above, the spin axis 44 is set to an angle $\alpha$ with the horizontal plane H. This oblique relationship reduces the profile of the system 10 such that it is more compact than a conventional air bearing design.

In the preferred embodiment, the bearing spindle 20 and the bearing sleeve 30 have respective outer and inner opposing surfaces (hereinafter, bearing surfaces 46A, 46B) that define a bearing gap 46. The bearing surfaces 46A, 46B are formed from 440-C stainless steel or its equivalent and are plain (grooveless) surfaces. The gap 42 is preferably selected from the range of 3 to 5 micrometers. The choice of a grooveless design constructed from steel makes for an inexpensive air bearing that is simpler to fabricate than most prior art designs.

The rotor assembly 42 may be rotated by suitable driving means (not shown for clarity) as known in the art. Embodiments of the illustrated air bearing have been successfully driven in excess of 12,000 RPM by use of driving means that includes a brushless radial field DC motor mounted integrally with the base 14. The location of the iron laminations in the radial field motor is such that the magnet exerts a slight retentive force on the the rotor assembly 42. This helps to prevent the rotor assembly 42 from bouncing on the jewel due to externally-induced vibration or motion.

Rotation of the rotor assembly 42 causes a thin air film to be built up in the gap 46. The bearing surface 46A achieves lift off from the bearing surface 46B at a relatively low speed (approximately 500 RPM); whereupon the rotor assembly 42 no longer contacts the spindle 20 at any point other than at the thrust bearing.

As shown in FIG. 2, a stationary light beam 50 from a coherent light source (not shown) may then be directed along a horizontal path through a stationary grating 52, whereupon the beam is directed upwards to the spinning hologon disc 40. By virtue of known diffraction phenomena, a scanning motion is imparted to the redirected light beam so as to form a scanning beam 54 having a scan direction within a horizontal scanning plane slightly displaced from the plane of the stationary beam 50. Due to the tilt of the spin axis and the arrangement of the source beam 50 and the scanning beam 54, both beams may be located within the overall height of the system 10. The tilt of the spin axis allows the height of the system 10 to be minimized. A beam scanning apparatus may thus be constructed that a very low and compact profile without resort to costly and complex beam-steering optics. The particular tilt of the spin axis 44 is preferably at an angle $\alpha$ of 33 degrees from the horizontal. Other tilt angles may be achieved, depending upon the optical characteristics that are particular to the design of the stationary grating 52 and the hologon disc 40.

Other aspects of the bearing design may be determined according to the particular application and as known in the art. Accordingly, further description of the preferred embodiment will be directed to a novel pretreatment of the bearing surfaces 46A, 46B that serves to significantly extend the start/stop life of the system 10 to well over 20,000 cycles.

During the development of the preferred embodiment of the system 10, it was discovered that the catastrophic failures of various prototype air bearings were largely attributable to several factors. The major factor appears to be the occurrence of momentary touchdowns of the rotor assembly during acceleration from the rest state to the operating state and during deceleration back to the rest state. The momentary touchdowns are believed to occur due to certain modes of instability that are excited as the bearing passes through these transitional states. Also, external vibrations are believed to be coupled to the rotating bearing, thus disturbing its spin axis and/or inducing a momentary mode of instability. A second factor is the tilt of the spin axis, which accentuates the radial load on the air bearing and aggravates the impingement of the bearing surfaces during pre-liftoff and post-touchdown rotations of the rotor assembly. Also, the momentary touchdowns are believed to be more prevalent in the illustrated embodiment due to the tilt of the spin axis.

Touchdown of the bearing surfaces causes a metal to metal contact wherein the contact area suffers significant, highly localized heating and momentary welding of the contacting surfaces, which are then are presumed to break free due to the momentum of the spinning bearing. Eventually, a momentary touchdown is believed to result in a weld which arrests the rotation of the bearing. The result is complete seizure of the air bearing, rendering it useless.

We have found that by distributing a trace amount of a boundary lubricant to the bearing surfaces 46A and 46B, prior to any significant operation of the bearing, the above-described incidence of bearing failure is forestalled until well over 20,000 start/stop cycles. Accordingly, the reliable operation of the contemplated air bearing is significantly extended beyond the failure rate of prior art designs.

The preferred method of establishing the desired residual layer of boundary lubricant is to apply a miniscule amount of a selected boundary lubricant to at least one (and preferably both) of the bearing surfaces 46A and 46B, and then to evenly distribute the applied trace amount by rubbing or burnishing the surface with a semi-adsorptive, fibrous material. Vigorous rubbing causes the trace amount to be spread such that only a very thin, substantially continuous, residual layer will remain. By "trace amount" is meant that the resulting residual layer is sufficient only to establish a minute, presumably uniform concentration of surface active molecules over the receiving surface. In fact, one effective method for distributing the composition is to polish the surface as if to remove the boundary lubricant. It is believed that the residual layer is approximately one-quarter micrometer or less in thickness, and may be significantly thinner (perhaps on the order of several molecules deep) in some applications.

In selecting the boundary lubricant, several properties should be optimized. Low volatility (i.e., low vapor pressure at the operating temperature) will prevent the condensation of lubricant-origin vapor on adjacent optical surfaces. Viscosity and its associated viscosity indexes (temperature and pressure) will in part determine the residual layer thickness. Resistance to oxidation and hydrolysis is directly related to the effectiveness of the boundary lubricant in that oxidation results in a non-lubricious composition which may include resins, sludges, and acids. Partial control of hydrolysis is possible by using oxidation inhibitors or by operating the bearing in an inert dry atmosphere (e.g. nitrogen). Lastly, the boundary lubricant should offer excellent lubricity and a compatibility with metals.

The foregoing combination of desired properties led us to the choice of a composition formulated from fluorinated oil and a thickener, and known generally as fluorinated grease. It is believed that this formulation is superior in the above-described properties to conventional hydrocarbon or other synthetic greases. The base oil used in the contemplated fluorinated grease is preferably selected from a series of low molecular weight, fluorine end-capped homopolymers of hexafluoro-propylene epoxide with the following chemical structure:

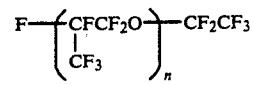

where n=10-60. Such fluorinated oils include perfluoroalkylpolyethers and are sometimes referred to in the literature as PFAE or PFPE oils; the Chemical Abstracts Index Name for these oils is oxirane, trifluoro (trifluoromethyl)-, homopolymer. The polymer chain is completely saturated and contains only the elements carbon, oxygen, and fluorine. On a weight basis, a typical florinated oil would contain 22% carbon, 9% oxygen and 69% fluorine.

One preferred formulation of the boundary lubricant is commercially available from the DuPont Company, Wilmington, Delaware, in the form of DuPont KRYTOX ® 240 series Florinated Grease, a combination of KRYTOX ® 143 florinated oil, a thickener and, in some specialty formulations, an additive. The preferred thickener is the solid tetrafluoroethylene telomer component of VYDAX ® 1000 Fluorotelomer Dispersion, available from DuPont.

The above-described fluorinated compositions have proven successful at extending the start/stop lifecycle of the illustrated system 10 without incurring any of the drawbacks commonly associated with oil- or grease-lubricated hydrodynamic bearings. Application of a trace amount of boundary lubricant in the form of a fluorinated grease has not been found to cause contamination of the hologon 40, stationary grating 52, or other optical components associated with the illustrated air bearing. No occurrence of a drag torque has been attributable to the boundary lubricant. Starting torque is also minimized.

Air bearings constructed according to the teachings of the present invention have been successfully operated at speeds above 20,000 RPM, in either vertical or tilted modes of operation, and with significant radial loads as are common to a hologon disc rotor assembly 42. Start/stop testing of the illustrated embodiment has been maintained without catastrophic failure for over 100,000 start/stop cycles. A summary of the average operating parameters achieved in the preferred embodiment are provided below.

| Operating Speed | 1000 to 30,000 rpm |
|---|---|
| Radial Stiffness | 150,000 lb/in. |
| Orientations | Vertical, or 33 degrees from horizontal |
| Bearing Clearance | 5 μm |
| Load Capacity | 3 lb |
| Start/stop cycle duration | over 130,000 cycles |

While it has been shown what are considered to be the preferred embodiments of the invention, it will be manifest that changes and modifications may be made without departing from the essential spirit of the invention. It is believed that other compounds or formulations that meet the above-described properties may be used as the compositions of boundary lubricant.

For example, at least one alternative composition, molybdenum disulfide (MoS$_2$), has been found to provide some extension of the start/stop lifecycle when burnished on the bearing surfaces to form the requisite surface active layer. Indium, lead, tin, silver, or tungsten disulphide are believed to be substitutes for molybdenum disulfide.

The bearing surfaces may be phosphated and the MoS$_2$ or other disulphide compound may be bonded or rubbed onto the phosphated surface.

Another alternative boundary lubricant preparation is to add a 5% stearic acid component to the preferred fluorinated grease. The chemical reaction between the acid and the metallic structure of the bearing surfaces is expected to accelerate such that the stearic acid is expected to chemically bond itself to the metal surface, and produce a lubricant film.

It is intended, therefore, in the annexed claims, to cover all such changes and modifications as may fall within the scope of the invention.

What is claimed is:

1. An improved self-acting cylindrical air bearing system for rotation of a beam deflection means, comprising:
   a bearing spindle;
   a bearing sleeve received by the spindle, the spindle and sleeve having respective bearing surfaces displaced by a bearing gap, and at least one bearing surface being subject to rotation with respect to the other bearing surface; and
   a residual layer of boundary lubricant formed on at least one of the first and second bearing surfaces.

2. The improved air bearing of claim 1, wherein the residual layer has a thickness less than the bearing gap width whereby the residual layer is discontinuous across the bearing gap.

3. The improved air bearing of claim 2, wherein the residual layer has a thickness of less than one half of the bearing gap width.

4. The improved air bearing of claim 2, wherein the residual layer has a thickness of less than approximately one-quarter micrometer.

5. The improved air bearing of claim 1, wherein the boundary lubricant comprises a base oil that is a fluorinated oil.

6. The improved air bearing of claim 5, wherein the base oil further comprises a polymer chain that is completely saturated, the polymer chain containing elements from the element group of carbon, oxygen, and fluorine.

7. The improved air bearing of claim 6, wherein the base oil contains on a weight basis approximately 22% carbon, 9% oxygen, and 69% fluorine.

8. The improved air bearing of claim 5, wherein the base oil is selected from a series of low molecular weight, fluorine end-capped homopolymers of hexafluoro-propylene epoxide with the following chemical structure:

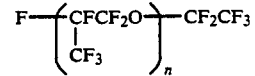

where n=approximately 10 to 60.

9. The improved air bearing of claim 5, wherein the base oil is selected from the group of fluorinated compositions known as perfluoroalkylpolyethers.

10. The improved air bearing of claim 5, wherein the fluorinated composition is a oxirane, trifluoro (trifluoromethyl)-, homopolymer.

11. The improved air bearing of claim 5, wherein the boundary lubricant further comprises a thickener and is known generally as fluorinated grease.

12. The improved air bearing of claim 11, wherein the thickener further comprises a solid tetrafluoroethylene telomer component.

13. The improved air bearing of claim 1, wherein at least one of the bearing surfaces includes pressure-generating grooves formed therein.

14. The improved air bearing of claim 1, wherein the bearing surfaces are grooveless.

* * * * *